United States Patent
Palmaer et al.

[11] Patent Number: 5,613,597
[45] Date of Patent: Mar. 25, 1997

[54] TRANSFER METHOD FOR PLASTIC CONVEYOR BELTS

[75] Inventors: Karl V. Palmaer, Folsom; Eric K. Palmaer, Gold River, both of Calif.

[73] Assignee: KVP Systems, Inc., Rancho Cordova, Calif.

[21] Appl. No.: 470,926

[22] Filed: Jun. 6, 1995

Related U.S. Application Data

[63] Continuation of Ser. No. 339,929, Nov. 15, 1994, abandoned, which is a continuation of Ser. No. 112,444, Aug. 26, 1993, abandoned.

[51] Int. Cl.$^6$ ................................................. B65G 17/06
[52] U.S. Cl. ............................................................ 198/853
[58] Field of Search ................................. 198/636, 850, 198/853

[56] References Cited

U.S. PATENT DOCUMENTS

| | | | |
|---|---|---|---|
| 685,115 | 10/1901 | Dodge | 198/853 |
| 786,903 | 4/1905 | Hyatt . | |
| 1,224,445 | 5/1917 | Burpee | 198/853 |
| 1,769,992 | 7/1930 | Furbish | 198/851 X |
| 2,693,268 | 11/1954 | Bau . | |
| 3,759,369 | 9/1973 | Vering et al. | 198/853 X |
| 3,770,106 | 11/1973 | Kuehl et al. | 198/853 X |
| 4,051,949 | 10/1977 | Lapeyre | 198/853 |
| 4,351,429 | 9/1982 | Garvey | 198/851 X |
| 4,542,821 | 9/1985 | Livermore | 198/851 X |
| 4,974,724 | 12/1990 | Lapeyre | 198/853 |
| 5,083,659 | 1/1992 | Bode et al. | 198/853 |
| 5,121,831 | 6/1992 | Fesler | 198/853 |
| 5,224,583 | 7/1993 | Palmaer et al. | 198/853 X |

FOREIGN PATENT DOCUMENTS

| | | | |
|---|---|---|---|
| 1044707 | 11/1958 | Germany | 198/853 |
| 0140406 | 11/1980 | Japan | 198/853 |

*Primary Examiner*—James R. Bidwell
*Attorney, Agent, or Firm*—Thomas M. Freiburger

[57] ABSTRACT

A method for transferring conveyed articles to and from a plastic conveyor belt involves a flat transfer plate positioned directly adjacent to the end run of a plastic open-link modular conveyor belt. The belt is of the type with interdigited projections of modules connected by transverse rods, and driven by sprocket wheels. Either a straight belt or a belt capable of travel around lateral curves can be used. For the smooth transfer of conveyed articles onto and off the belt, the plastic belt modules have arched upper surfaces, each defining a short segment of a cylinder, so that when the belt passes over a sprocket wheel or roller at the end run, the upper surfaces of adjacent modules define a smooth half cylinder. A fixed preferably fixed transfer plate is positioned against the defined cylindrical surface, at or slightly below the level of the belt's upper surface. The open link or foraminous belt allows free passage and circulation of liquids and gases through the belt for processing of products conveyed and to facilitate cleaning and sterilization of the belt.

7 Claims, 2 Drawing Sheets

TRANSFER METHOD FOR PLASTIC CONVEYOR BELTS

This is a continuation of application Ser. No. 339,929, filed on Nov. 15, 1994, now abandoned, which was a continuation of application Ser. No. 112,444, filed on Aug. 26, 1993, now abandoned.

BACKGROUND OF THE INVENTION

This invention is concerned with modular plastic conveyor belts, and particularly with an improved method for transferring articles from a plastic conveyor belt made up of segments or modules.

In many conveyor belt applications, there is a need to transfer items or materials from one conveyor belt to another surface. One typical approach is to place the conveyor belt at a higher level than the other surface, and merely allow items to fall from the belt as the belt passes over a sprocket or roller, so that the items fall onto the surface below. Unfortunately, in many applications this approach cannot be used because the items or materials to be transferred are fragile and can be damaged by the fall.

Another approach to transferring items at the end of a conveyor run is to place a transfer support surface adjacent to and approximately level with the downstream end of the conveyor run, at the point of the belts return over a roller or a row of sprockets. Unfortunately, such a method is generally only applicable to large items because the gap between the transfer support surface and the belt will vary as the flat surfaced belt segments or modules round the sprocket or roller. As a result of the gap's opening and closing, smaller items can slip through the space or clog the space.

In U.S. Pat. No. 4,051,949 there is shown and described a modular conveyor belt and fingered comb combination for transferring articles to and from a conveyor belt. A similar system is shown in U.S. Pat. No. 5,083,659. In both these patents, an open link modular belt is provided with relatively high, linear topped vertical ribs or finger plates which extend along each module in the direction of movement of the belt. These ribs or ridges form axial passageways down the surface of the belt, through which teeth of the transfer comb, located at the end of the conveyor belt run, can extend. As the belt passes through the transfer comb, items on the belt are smoothly transferred from the conveyor belt surface to the surface of the comb. The patent discloses a module configuration intended to minimize the rise and fall of the vertical plates as the belt passes over the sprocket or roller. A problem with such a system is that the teeth on the transfer comb have a tendency to break off, and the module plates are also somewhat fragile.

A principal object of this invention is to provide an open link conveyor belt transfer system capable of moving articles on or off the belt with as little disturbance as possible, while at the same time avoiding the need for transfer combs. The invention is directed to overcoming the shortcomings of the transfer methods and apparatus set forth above, with a simple transfer method which was not contemplated in previous conveyor systems.

Several patents have disclosed arched-top links in conveyor belts and in that sense are relevant to the present invention. Furbush U.S. Pat. No. 1,769,992 shows a conveyor for use with sticky or pasty material, particularly for a drying operation. The links are formed with arched tops so as to pass around sprockets at the end of the conveyor run in a cylindrical form. This configuration was disclosed for the purpose of helping effect transfer of the conveyed material; however, transfer is accomplished not smoothly onto a platform, but with a rotatable beater and rotatable brush, both of which remove the conveyed material and clean any material which might stick to the conveyor.

Livermore U.S. Pat. No. 4,542,821 is relevant in that it discloses a "humpback conveyor" which forms a cylindrical surface on passing over a sprocket, and which employs a "doctor blade" for cleaning the surface of the conveyor as it passes over the sprocket (FIG. 1). The conveyor is disclosed as being for use in food processing where material may adhere to and may need to be cleaned from the surface of the belt. The belt is formed of metal links which extend throughout the width of the belt, rather than being in modules each of which is of lesser width than the composite belt. The "doctor blade" shown in the Livermore patent is a steeply inclined scraper blade positioned at the cylindrical surface formed by the links as they pass over the sprocket; the blade is strictly for cleaning residual material off the belt, not for purposes of transfer.

Ball U.S. Pat. No. 2,693,268, also showing a conveyor formed of full-width links which apparently are of metal, shows transfer of conveyed material using a scraper blade with a knife edge, substantially contacting the cylindrical surface of the arched-top links as they pass around a sprocket or roller. The patent discusses the advantage of the arched-top link configuration as enabling discharge to an adjacent conveyor without relying on a significant elevation difference between the conveyors. As in other prior conveyor belts of this nature, Ball shows a belt which is not open but which is closed to the maximum extent possible to prevent particles from falling down through the conveyor, being designed for handling loose materials such as coal particles which could clog and jam in the conveyor.

The following additional patents show conveyor belts having some pertinence to this invention: Bode U.S. Pat. No. 5,083,659, Fesler U.S. Pat. No. 5,121,831, Garvey U.S. Pat. No. 4,351,429, Burpee U.S. Pat. No. 1,224,445 (disclosing in column 1 but not illustrating a "stationary deflector" for removing fish from the belt), Hyatt U.S. Pat. No. 786,903 and Dodge U.S. Pat. No. 685,115.

The present applicant has also produced and sold a modular, open-link conveyor belt, the width of which was made up of two or more plastic modules, the links having arched tops, for use in the sewage treatment industry and not as a transfer device. The belt has been used with a scraper blade contacting the arched tops of the links as they pass around an end roller, presenting a cylindrical surface, the scraper blade being strictly for the purpose of scraping the belt clean and not being arranged as a transfer platform. It is the method of using such a belt for smooth transfer of conveyed products, which is the subject of this invention.

SUMMARY OF THE INVENTION

The product transfer method of this invention employs a modular plastic conveyor belt, preferably of the open link type. The modular belt includes a series of connected elongated molded plastic belt module rows each including one or more belt modules in the row. The belt module rows are connected by rods extending transversely to the length of the conveyor belt, with each belt module row having a plurality of first spaced projections generally in a pattern of regular spacings and extending in one direction from the row and a plurality of second spaced projections generally in a pattern of regular spacings extending in the opposite direction from the row. The first and second projections of serially adjacent module rows are longitudinally overlapping and juxtaposed when the modules are connected serially in the conveyor belt by the connecting rods which extend through transverse openings in the projections. A belt row can be formed of one or more modules placed end to end, to create a belt of the desired width, with the modules arranged in a brick-laid pattern so that module joints of one row do not coincide with module joints of an adjacent row, ahead or behind.

The upper surface of each module is rounded or arched, so that viewed from the side the upper surface of each module defines an arc segment, with the arc radius roughly equal to the maximum thickness of the belt module plus the radius of a sprocket, shaft or roller which the belt rounds at the end of a run. Thus, when the belt passes around a shaft or roller of the appropriate radius, the arched surfaces of adjacent module rows form a relatively smooth semi-circular cylindrical surface on the belt, which extends continuously through about 180° through successive modules as the belt passes around the shaft. This allows the belt surface, as it passes around the shaft or roller, to be maintained at a constant radius such that a transfer plate may be positioned against or in close proximity to the belt, whereby either no gap or a small gap of constant width (not varying over time) remains between the transfer plate and the belt surface. The method of the invention therefore allows for smooth transfer of items from the belt to the transfer plate, and obviates the need for a transfer comb and special belt with finger plates to effect the transfer, as used in the prior art.

In one particular embodiment the invention contemplates open link type modular plastic conveyor belts, meaning modular belts formed with projections in such a way as to leave significant open space through the belt from top to bottom as for air flow, liquid flow, dropping of particles, etc. As an example, about 50% of the belt surface may be open.

It is therefore among the objects of the invention to both simplify and improve on the manner in which conveyed articles are transferred from one plastic modular conveyor belt to another. These and other objects, advantages and features of the invention will be apparent from the following description of preferred embodiments, considered along with the accompanying drawings.

DESCRIPTION OF PREFERRED EMBODIMENTS

Figure 1:
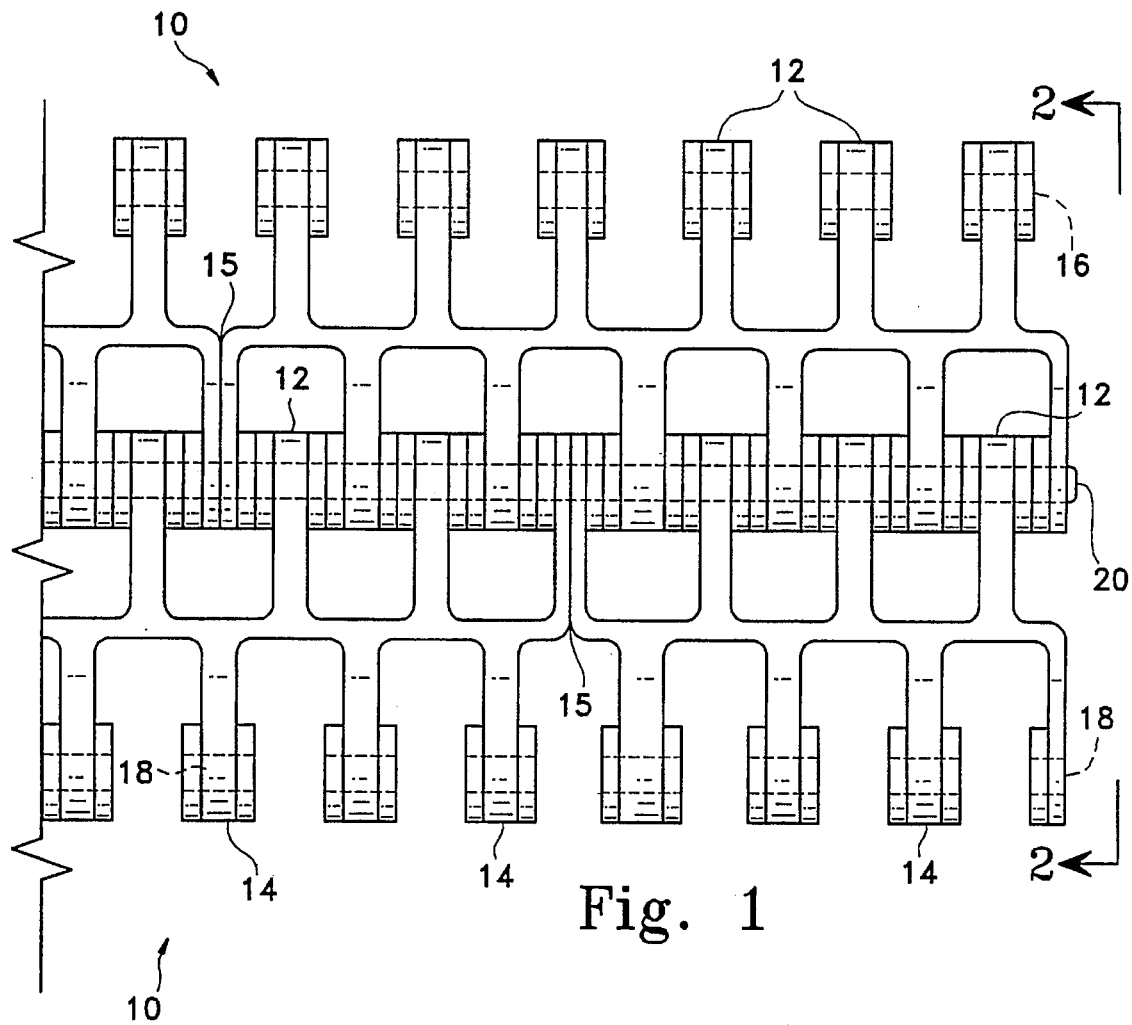
FIG. 1 is a top plan view showing a portion of a conveyor belt including several interconnected plastic modules which can be used in the method of the invention.

FIG. 1 shows two plastic modules 10 used in a preferred embodiment of the method of the invention, as part of a modular, preferably open link plastic conveyor belt (although a solid top belt could be used in some applications). The two modules 10 are shown in interdigited position for serial interconnection with each other to form a section of such a belt. Each of the modules 10 is integrally formed of plastic. A plurality of first projections 12 extend from one side of each module, and a plurality of second projections 14 extend from the other side of each module 10. In the embodiment shown, the first projections 12 extend integrally from the module in interdigited location (which may be symmetric as shown) with respect to the second projections 14.

Figure 2:
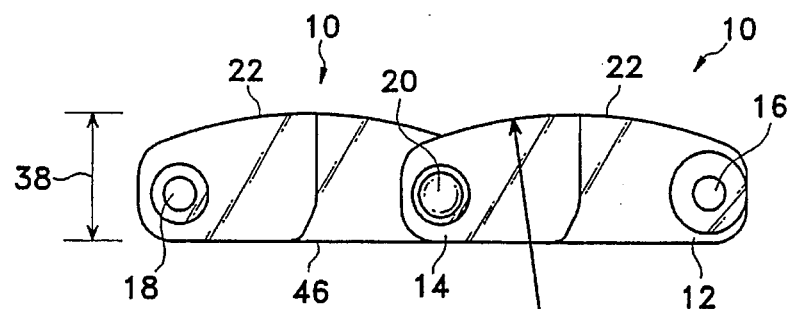
FIG. 2 is a side view of the two modules of FIG. 1.

Each of the first projections 12 has a generally cylindrical aperture 16 passing through its end, as shown in FIGS. 1 and 2. The apertures 16 are aligned through the projections. Similarly, each of the second projections 14 also has a similar aperture 18 passing through its end, which are also aligned. As is well known in plastic modular conveyor belts, the modules are interconnected by aligning the first projections 12 of one module interdigitally with the second projections 14 of the neighboring module, with a cylindrical rod 20 (preferably of plastic) passed through the aligned apertures 16 and 18, connecting the modules together but allowing the modules to rotate about the cylindrical rod 20.

The belt section formed by the two modules 10 in FIG. 1 consists of two belt rows with each row defined by several modules. An individual row usually will consist of more than one module. As is well known, modules in alternate module rows may be staggered in a "brick laid" pattern, with for example three modules in one row, two (wider) modules in the next row, then three modules, etc. Additionally, the first and second projections 12 and 14 which extend from the module 10 may in other embodiments extend from the module in other than regular alternate interdigited location with respect to each other.

Figure 3:
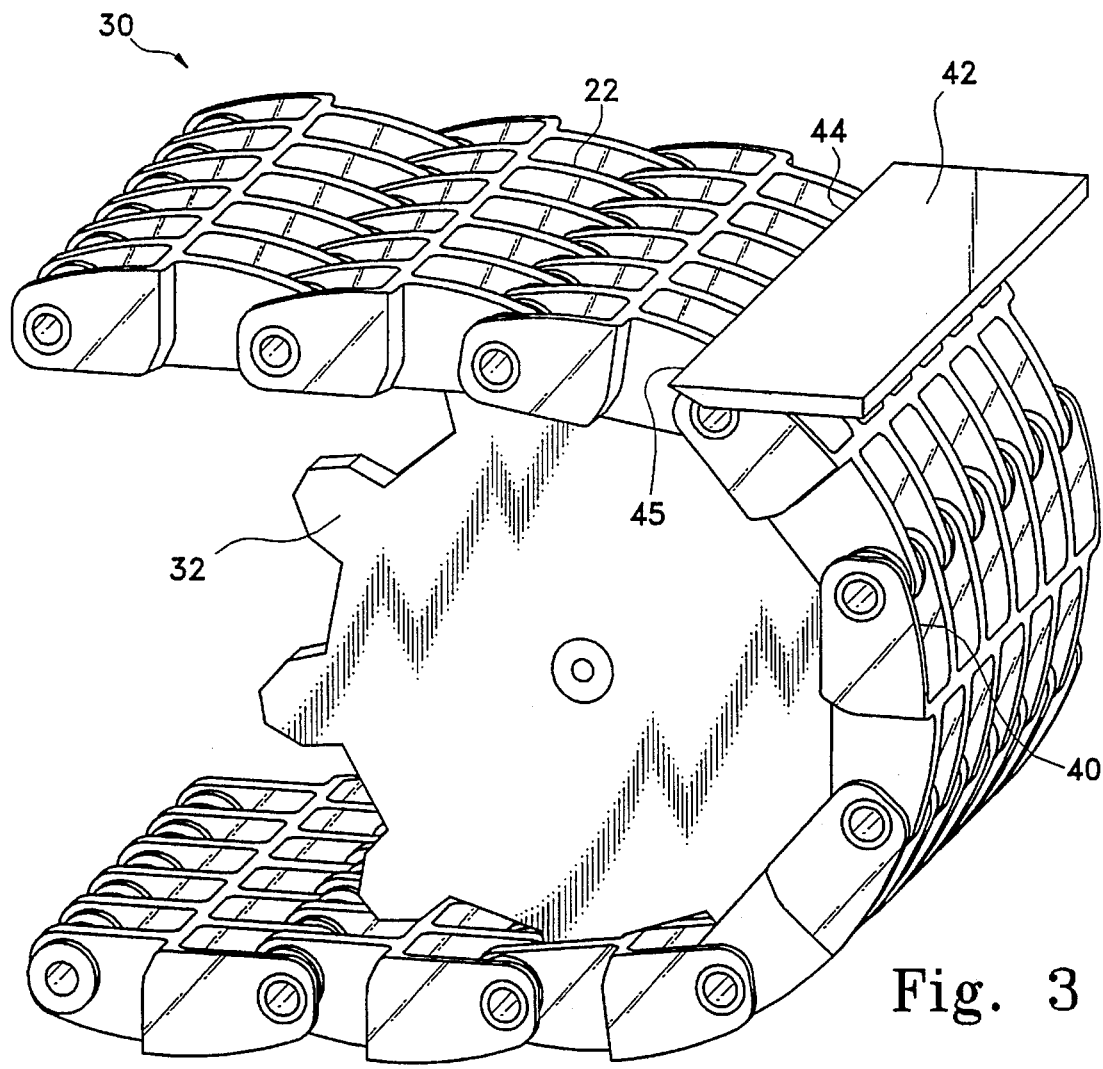
FIG. 3 is a side perspective view showing a conveyor belt according to the invention, passing around a sprocket or roller and with a transfer plate positioned adjacent to the belt surface 30 as to receive conveyed products from the belt.

FIG. 2 shows the two modules 10 of FIG. 1. The cylindrical apertures 16 and 18 of the first and second projections 12 and 14 can be seen. Seen in this side profile, the upper surface 22 of a module 10 defines a smooth, uninterrupted arc segment. When a conveyor belt 30 formed of the modules 10 passes over a sprocket shaft or roller 32 (FIG. 3), the belt 30 follows a circular arc about the sprocket 32, forming generally a semi-cylindrical surface 40. The radius R of the arc segment defined by the top surface 22 of a module 10 is approximately equal to the radius of the sprocket shaft 32 added to the maximum thickness 38 of a belt module, i.e. the module thickness from the sprocket out to the module's outer surface 22 (taking into account that the sprocket teeth enter the bottom of the module). With the radius R of the upper module surface 22 so selected, the belt 30 passing over the sprocket shaft 32 will form a smooth cylindrical surface 40 (FIG. 3), although open in this embodiment, so that the belt surface transitions smoothly and continuously from module to module at the end roller or sprocket, without bumps in the surface. Viewed from a stationary position, the cylindrical belt surface 40 will not rise and fall (i.e. protrude and recede) as the belt 30 passes over the sprocket or roller 32.

A relatively smooth edged transfer plate 42 can be placed in close proximity to or even directly against the belt surface 40 as the belt 30 rounds the sprocket or roller. The transfer plate preferably is slightly below a line touching the tops of the arched-top modules, for efficient transfer. For example, the surface of the transfer plate may be about 1/16" to 1/8" below the line of the arched tops, for a belt of 2 inch pitch. Because the belt surface 40 forms a smooth cylindrical surface, any gap 44 between the belt surface and the transfer plate 42 will remain substantially constant. Because the belt surface 40 does not rise and fall with respect to the position of the transfer plate 42, the transfer plate 42 may be fixed in its position, rather than being a movable transfer plate mounted with pivot and springs or similar arrangements. The plate can taper to a very narrow transferring edge 45 if desired.

A similar transfer plate arrangement can be used for transferring items onto the belt, but of course this is typically an easier task since items may simply be dropped a short distance from an elevated transfer plate to place them on the belt.

Figure 2A:
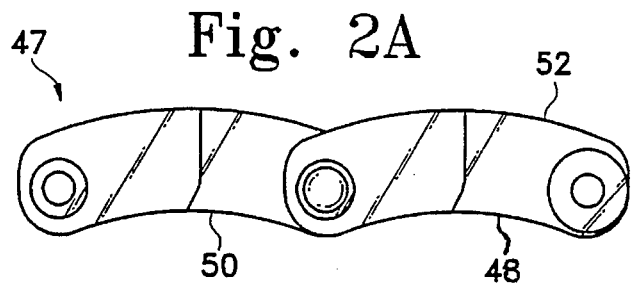
FIG. 2A is a side view of two modules in a modified form.

In the belt modules shown in FIG. 2, the lower surface 46 of the module is flat. However, in another form of module 47 shown in FIG. 2A, the lower surface 48 of a belt module defines an arc 50. The arc 50 of the lower surface and the arc 52 of the upper surface preferably have a common arc center. When a belt constructed of such modules 47 passes over an end roller or sprocket, both the upper and lower surfaces of the belt will define smooth cylindrical segments passing smoothly from module to module.

Figure 4:
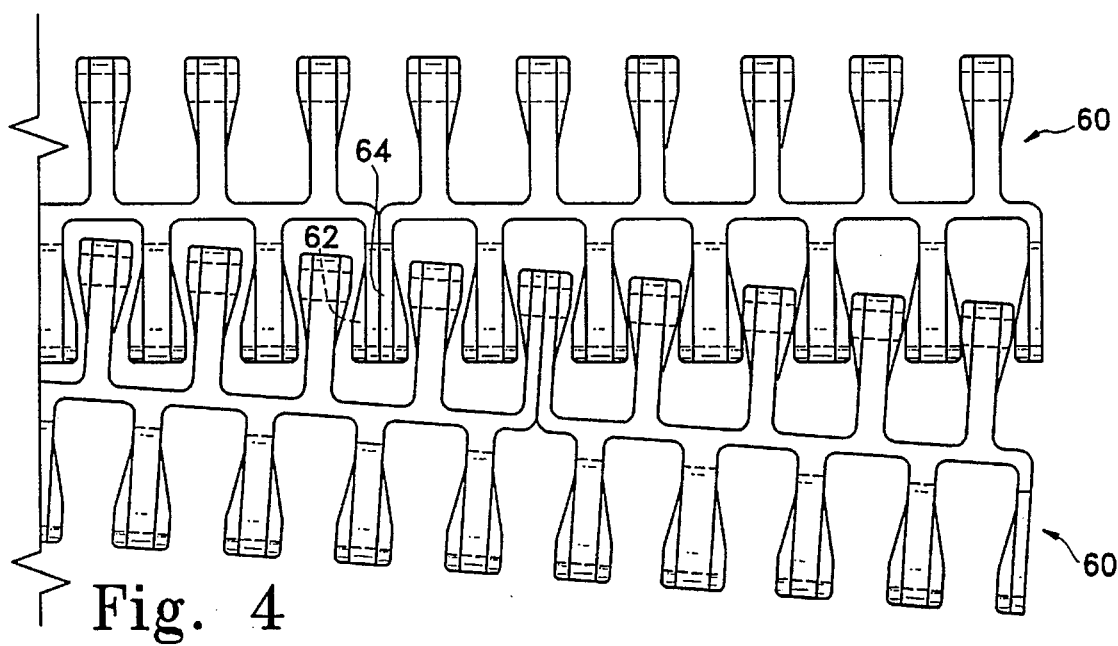
FIG. 4 is a top plan view of two modules according to another embodiment of the invention, adapted to form a belt which can pass around lateral curves.

Belt modules in accordance with the principles of the invention may be constructed so that a belt may pass around lateral curves. The belts and modules may be generally similar to those shown in U.S. Pat. Nos. 4,742,907 and 5,181,601. FIG. 4 herein shows two connected belt module rows 60 which are adapted to pass around lateral curves, again with module assembly staggered from row to row. The modules are similar to the modules 10 of FIG. 1 in having arched top construction. However, the apertures 62 of the second plurality of projections 64 define an elongated slot extending parallel to the length of the modules, as in the two above-referenced patents. As is well known, this allows the modules to collapse together at the inside of curves to facilitate curving travel as well as straight travel of the belt, as shown in U.S. Pat. Nos. 4,742,907 and 5,181,601.

The above described preferred embodiments are intended to illustrate the principles of the invention, not to limit its scope. Other embodiments in variations to these preferred embodiments will be apparent to those skilled in the art and may be made without departing from the spirit and scope of the invention as defined in the following claims.

We claim:

1. A method for smooth transfer of conveyed articles between a plastic modular conveyor belt and a transfer platform, comprising the steps of:

providing a modular plastic conveyor belt of the type made up of a series of connected elongated molded plastic belt module rows each including one or more belt modules in the row such that belts of varying selected widths can be made up from the modules in a staggered, brick-laid pattern, with the belt module rows connected by rods extending transversely to the length of the conveyor belt, each row having a series of first spaced projections generally regularly spaced and extending in one direction from the row and a series of second spaced projections generally regularly spaced and extending in an opposite direction from the row, the first and second projections of serially adjacent module rows being longitudinally overlapping and juxtaposed when the modules are connected serially in the conveyor belt by the connecting rods extending through transverse openings in the projections, providing arched top surfaces on each conveyor belt module, defining generally a circular arc extending longitudinally over the module from the first projections to the second projections and thus defining a portion of a cylinder with the arched top of each module and each module row, operating the plastic conveyor belt to move the belt over a generally cylindrical roller or sprocket wheel at the end of a run, the arched cylindrical top surfaces of the modules having a radius which is related to the radius of the roller or sprocket wheel over which the belt returns at the end of a run, such that as the belt passes over the sprocket wheel or roller, a generally smooth cylindrical surface is formed, continuous through approximately 180° where the belt returns at the end of the run, placing a transfer plate adjacent to and substantially in contact with the smooth cylindrical surface of the belt at the end of the run, the transfer plate being positioned to accommodate movement of conveyed articles smoothly over its surface, and the transfer plate having a relatively thin straight edge adjacent to the belt located so as to smoothly receive conveyed articles from the top of the smooth cylindrical surface as the belt passes around the sprocket or roller, and smoothly transferring conveyed articles between the surface of the conveyor belt and the transfer platform.

2. The method of claim 1, wherein the plastic conveyor belt modules have slotted openings in the second projections to accommodate angling of the module rows for travel around lateral curves.

3. The method of claim 1, including the step of forming each module row of at least two modules.

4. The method of claim 1, wherein the modular plastic conveyor belt is an open link belt with spaces through the belt.

5. The method of claim 1, including placing the thin straight edge of the transfer plate at a position slightly below a line defined by the tops of the series of arched top surfaces of the modules as they approach the end of the run.

6. The method of claim 5, including placing the thin straight edge of the transfer plate at a position about 1/16" to 1/8" below a line defined by the tops of the series of arched top surfaces of the modules as they approach the end of the run.

7. The method of claim 1, further including providing arcuate lower surfaces on each conveyor belt module, defining generally a circular arc at the lower surface of each module between extremities of the first projections and the second projections, the arcuate lower surfaces of the modules having a radius which is related to the roller or sprocket wheel over which the belt returns at the end of the run, such that as the belt passes over the sprocket wheel or roller, a generally common arcuate center is defined with the surface of the sprocket wheel or roller and the generally smooth cylindrical surface formed by the top surfaces of the modules, thereby providing smooth operation over the roller or sprocket wheel.

* * * * *